United States Patent
Scholz et al.

(10) Patent No.: US 9,302,342 B2
(45) Date of Patent: Apr. 5, 2016

(54) METHOD FOR OPERATING A WELDING CONVERTER AND APPARATUS

(71) Applicant: Robert Bosch GmbH, Stuttgart (DE)

(72) Inventors: Reinhard Scholz, Erbach (DE); Alfred Punzet, Erbach (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 13/910,671

(22) Filed: Jun. 5, 2013

(65) Prior Publication Data

US 2013/0334178 A1 Dec. 19, 2013

(30) Foreign Application Priority Data

Jun. 6, 2012 (DE) .......................... 10 2012 011 246

(51) Int. Cl.
*B23K 11/24* (2006.01)
(52) U.S. Cl.
CPC ............... *B23K 11/241* (2013.01); *B23K 11/24* (2013.01); *Y02P 70/181* (2015.11)
(58) Field of Classification Search
CPC .......... B23K 9/09; B23K 9/10; B23K 9/1006; B23K 9/1012; B23K 9/1075; B23K 9/12; B23K 9/091; B23K 9/092; B23K 11/241
USPC .......................................................... 219/108
See application file for complete search history.

(56) References Cited

U.S. PATENT DOCUMENTS 5,965,038 A * 10/1999 Nomura et al. ................ 219/110
6,087,629 A * 7/2000 Thamodharan et al. 219/137 PS

FOREIGN PATENT DOCUMENTS

DE     41 34 461 A1   4/1993
EP     0 227 924 A2   7/1987

OTHER PUBLICATIONS

German Patent and Trademark Office, Search Report corresponding to Application No. 10 2012 011 246.7, dated Mar. 22, 2013 (German language document) 8 pages.

* cited by examiner

*Primary Examiner* — Brian Jennison
(74) *Attorney, Agent, or Firm* — Maginot, Moore & Beck LLP

(57) ABSTRACT

The disclosure describes a system that uses an active filter connected to phases of a three-phase power grid in parallel with a resistance welding apparatus in order to bring an input current of a welding converter closer to a sinusoidal shape.

8 Claims, 2 Drawing Sheets

METHOD FOR OPERATING A WELDING CONVERTER AND APPARATUS

This application claims priority under 35 U.S.C. §119 to patent application no. DE 10 2012 011 246.7, filed on Jun. 6, 2012 in Germany, the disclosure of which is incorporated herein by reference in its entirety.

The disclosure relates to a method for operating a resistance welding apparatus. The resistance welding apparatus comprises a welding converter that can be connected to a multiphase power grid and which rectifies the AC line current. A two-phase pulse-width-modulated alternating current is in turn generated from the rectified AC line current using power semiconductors, which generated current can be supplied to the primary side of a welding transformer.

BACKGROUND

Patent application DE 41 34 461 A1 shows a method for avoiding excessive currents in a welding converter that generates a two-phase pulse-width-modulated alternating current from a rectified AC line current using power semiconductors, which generated current is supplied to the primary side of a welding transformer.

The method comprises the following steps: The current of at least one phase of the primary circuit is measured via a sensor, the time derivative of each measured current signal is formed via differentiation with respect to time, the time-derived measurement signal is compared to a specified maximum value. If the time-mapped measurement signal exceeds the specified maximum value, a signal is emitted that leads to the deactivation of the power semiconductors.

The arrangement shown here comprises a so-called B6-input bridge that is connected directly to a multiphase power grid. Such input bridges cause extremely high harmonic currents in the power grid. In particular, the fifth harmonic can be up to 80%, and even if a line inductor is connected upstream, a maximum reduction of 40% can be expected.

The object of the disclosure is to provide an apparatus and a method so that the above-mentioned disadvantageous effects are avoided or minimized as much as possible.

SUMMARY

The disclosure uses an apparatus described initially, wherein this apparatus is implemented such that the AC line current can be sinusoidally adjusted via a preferably active line filter before the two-phase pulse-width-modulated alternating current is generated for a connectable welding transformer from the AC line current using the power semiconductors.

As a result of the reduction of the harmonic currents, the power grid effective phase current decreases, and thus the loss in the power grid feed line also decreases. The smaller higher-frequency power grid current components produce less loss in the power grid feed-in.

The line filter preferably measures the line voltage and/or the line current automatically via a measuring apparatus for measuring the line voltage and/or the line current.

The voltage and current of two phases are measured. The third phase can optionally also be measured in order to regulate the neutral point of the power grid.

In addition, the line filter automatically detects deviations of the line current from the shape of an essentially sinusoidal current.

Furthermore, the active line filter preferably automatically feeds in line current via a feed-in arrangement, and if necessary, also automatically feeds current back into the power grid again via a return feed arrangement.

These measures make it possible to reduce the harmonics described initially and to work with nearly sinusoidal waveforms.

The scope of protection also includes a resistance welding apparatus having all components required for implementing the method according to the disclosure.

This includes in addition to a preferably active filter that is connected to the phases of the multiphase power grid in parallel with the resistance welding apparatus and is preferably included in the power grid connection apparatus.

In addition, the preferably active line filter comprises a measuring apparatus for measuring the line voltage and/or the line current, as well as an arrangement for determining deviations of the line current from the shape of a sinusoidal current and an arrangement for feeding in current from the power grid into the line filter.

The preferably active line filter preferably automatically determines deviations of the line current from the shape of a sinusoidal current. For this purpose, the active line filter is equipped with a control strategy that is adapted to the bridge circuit present in the resistance welding converter. It is thus possible to handle sinusoidal waveforms in an optimal manner.

The active line filter automatically feeds the line current into the line filter via a feed-in arrangement.

The connected resistance welding converter requires less instantaneous current during the feed-in phase of the active filter. The current required for implementing the expected sinusoidal shape of the line current can thus be accommodated and stored temporarily and fed back at the appropriate time by the active line filter.

If the resistance welding converter requires a higher current than the power grid can provide, the active filter feeds the required current back into the power grid in order to reproduce the expected sinusoidal shape of the power grid phase current overall.

In order to implement the method described above, a resistance welding apparatus having a power grid connection apparatus for connecting to a multiphase power grid is proposed. This resistance welding apparatus also comprises a rectifier unit for rectifying the AC line current and a DC voltage intermediate circuit for routing the rectified AC line current to an inverter constructed from power semiconductors. This arrangement is implemented such that the inverter is able to supply a pulse-width-modulated alternating current to the primary side of a welding transformer. According to the disclosure, an active filter is comprised that is connected to the phases of the multiphase power grid in parallel with the resistance welding apparatus and is preferably comprised by the power grid connection apparatus.

During operation, it is thus possible to reduce harmonic currents, causing the power grid effective phase current and thus the loss in the power grid feed line to decrease. The smaller higher-frequency power grid current components produce less loss in the power grid feed-in.

A measuring apparatus is preferably comprised for measuring the line voltage and/or the line current. The measurement of the line voltage serves to specify the in-phase current set point value for the active line filter. The measuring apparatus is implemented such that voltage and current of two phases are measured. It is optionally also possible to implement the measuring apparatus such that it is possible to include a third phase in the measurement in order to control the neutral point of the power grid.

The preferably active line filter comprises an arrangement for determining deviations of the line current from the shape of a sinusoidal current.

DETAILED DESCRIPTION

Figure 1:
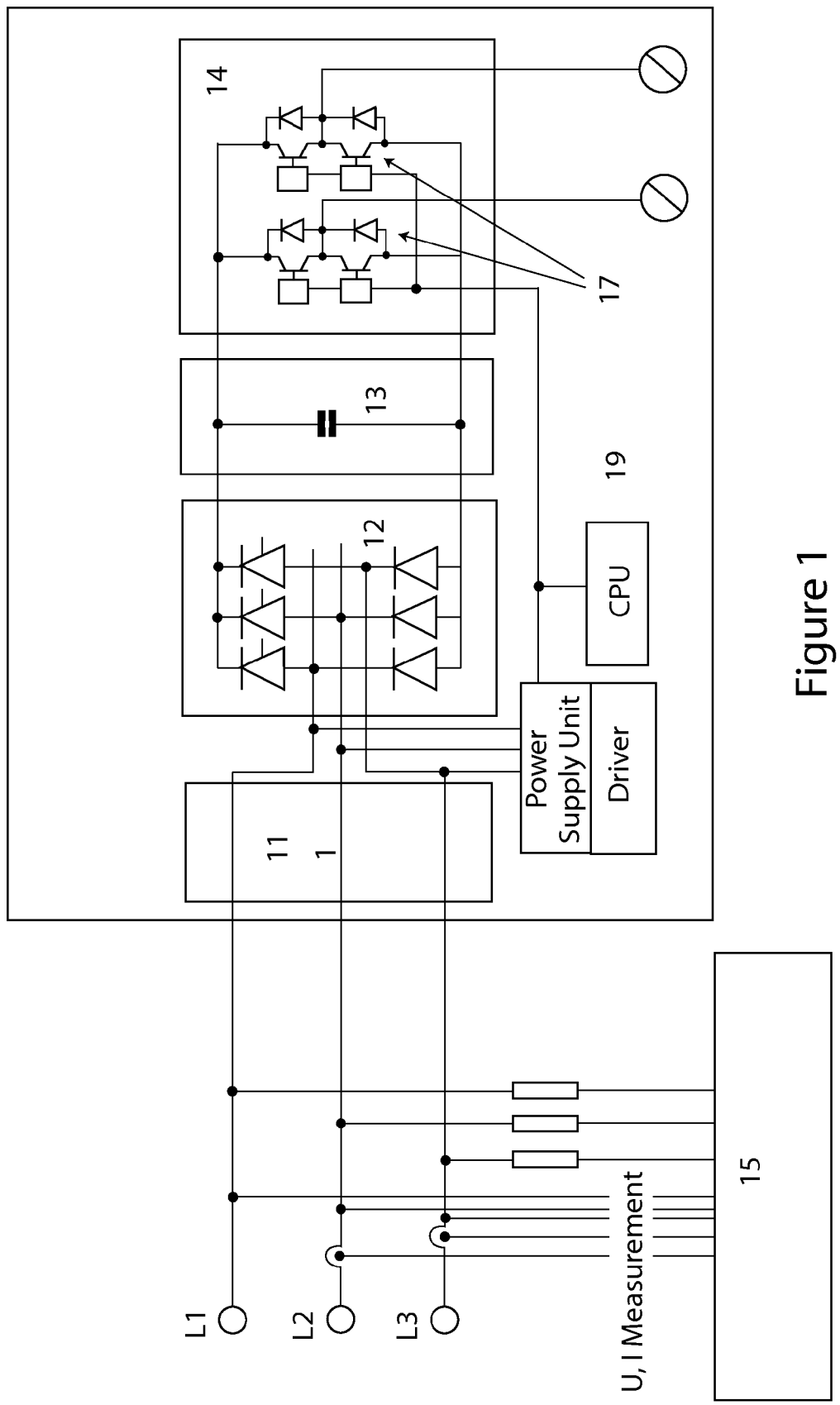
FIG. 1 shows a circuit diagram of a resistance welding system, as described herein.

FIG. 1 shows the circuit diagram of a resistance welding system 16 forming the basis of the disclosure. The main components of the system 16 are a power grid connection 11, a semicontrolled (B6) bridge rectifier 12, a DC voltage intermediate circuit 13, an IGBT inverter 14, and an active filter 15.

A control device (not shown) is also normally provided, which takes control of the resistance welding system.

The system 16 works according to the following functional principle: A three-phase 50/60 Hz AC line current L1-L3 is supplied to the B6 bridge rectifier 12 via the power grid connection 11. The voltage present at the output of the bridge rectifier 12 is supplied to the DC voltage intermediate circuit 13. The DC voltage intermediate circuit 13 in turn supplies the input voltage for the IGBT inverter 14. A welding transformer (not shown) can be connected on the primary side to the output of the IGBT inverter 14, which welding transformer is supplied by the IGBT inverter 14 with a pulse-width-modulated alternating current.

The main components of the IGBT inverter 14 are four power semiconductors 17 arranged in an H-bridge connection, which can be controlled alternately according to the desired frequency via a control unit 19. A pulse-width-modulated alternating current thus arises in the IGBT inverter 14 from the intermediate circuit direct current.

The resistance welding system 16 is connected to the three-phase power grid L1-L3 via the power grid connection 11. According to the disclosure, in parallel with this, the active filter 15 is also connected to the three-phase power grid L1-L3.

The filter 15 and the three phases L1-L3 are connected via line inductors. Current and voltage measurements are performed in the three power grid phases in order to detect the current in the active filter deviating from the sinusoidal shape, which is fed in or fed back by the active line filter according to the disclosure at the power grid connection 11 of the resistance welding system in such a way that an essentially sinusoidal current is provided to the resistance welding system at the power grid connection 11.

The active filter 15 thus causes a compensation current to be provided, thereby substantially reducing the power grid loss due to the harmonic currents that are no longer present. It is possible to reach a power factor of 1, the power factor representing the ratio of the magnitude of the real power to the apparent power. The filter 15 also performs a voltage-current measurement with respect to the phases L1-L3.

The reference number 18 identifies other components, such as power supplies, drivers, etc.

Figure 2:
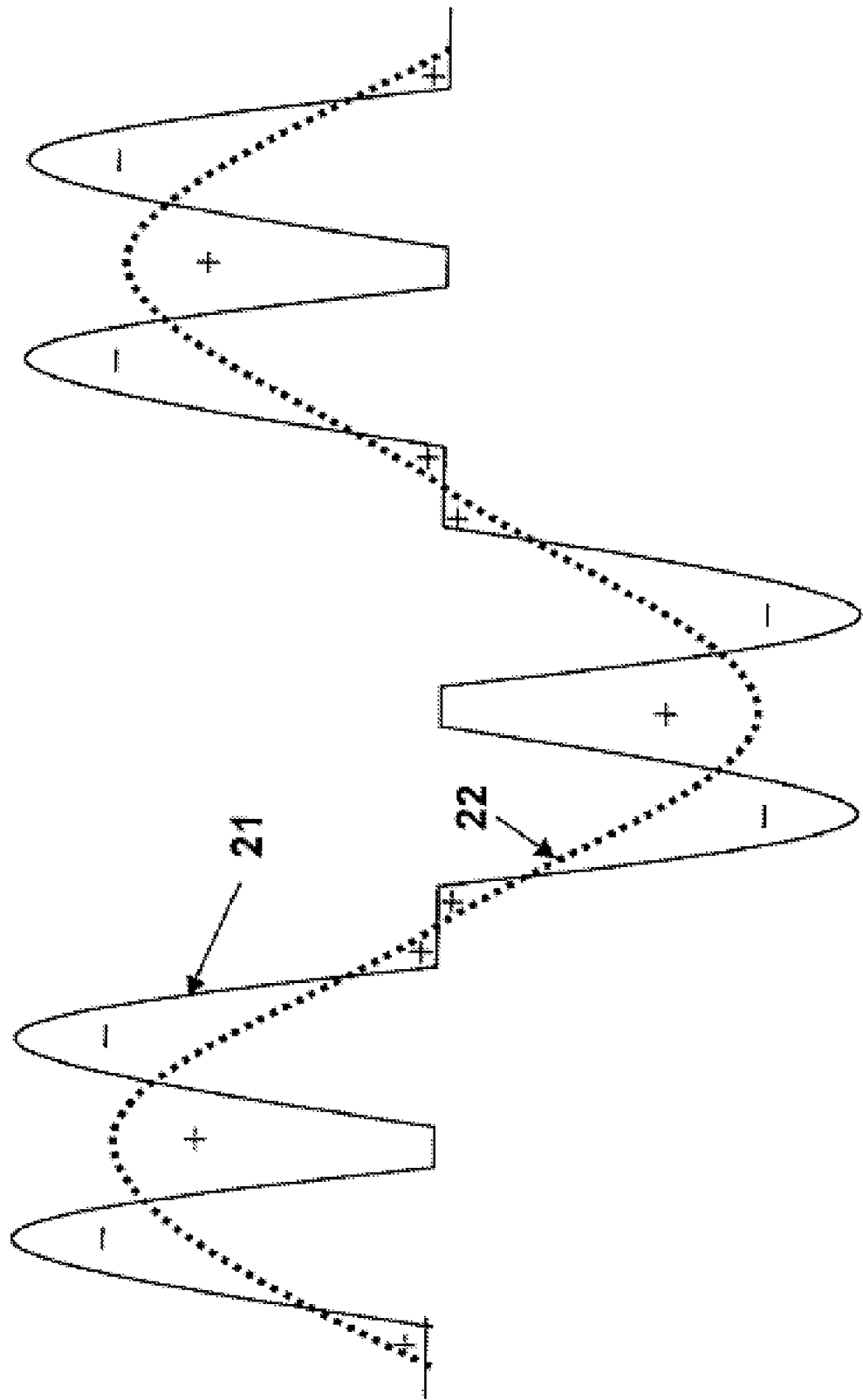
FIG. 2 shows a high-level schematic representation of the method of operation of the resistance welding system of FIG. 1.

FIG. 2 shows a high-level schematic representation of the method of operation of the disclosure. The B6 bridge rectifier on the input side generates harmonics 21 in the power grid and waveforms that deviate relatively sharply from the sinusoidal shape 22. If no measures are taken to prevent them, these harmonics 21 represent the current supplied to the resistance welding system. The active filter 15 having the feed-in function and the return feed function according to the disclosure provides the areas indicated by the plus signs and the minus signs as compensation currents to the for operating the welding converter. The areas indicated by the plus signs are compensated via input currents (+) provided by the active filter 15. The areas indicated by the minus signs are compensated via return currents provided by the active filter 15. This causes the otherwise highly distorted input current to the resistance welding system to be smoothed out and to closely approximate an ideal sinusoidal waveform. The resulting advantages with respect to the reduced harmonic content have already been described above.

The method according to the disclosure and the apparatus according to the disclosure are in principle conceivable in all applications that involve disadvantages due to existing harmonics, caused in particular by large inductances encompassed by the apparatus.

What is claimed is:

1. A method for operating a resistance welding apparatus comprising:
   measuring at least one of an AC line voltage of an AC line and an AC line current of the AC line;
   adjusting the AC line current of the AC line with an active line filter by generating a compensating current based on a difference between the at least one of the AC line voltage of the AC line and the AC line current of the AC line with a shape of a sinusoid;
   rectifying the adjusted AC line current with a rectifier;
   generating a two-phase pulse-width-modulated AC current from the rectified AC line current using a plurality of power semiconductors; and
   supplying the two-phase pulse-width-modulated AC current to a primary side of a welding transformer.

2. The method according to claim 1, the measuring further comprising:
   measuring the at least one of the AC line voltage of the AC line and the AC line current of the AC line with a measuring apparatus and using at least two phases of the AC line.

3. The method according to claim 1, the adjusting further comprising:
   adjusting the AC line current of the AC line with the active line filter by generating a negative compensating current when the at least one of the AC line voltage of the AC line and the AC line current of the AC line is greater than the shape of the sinusoid.

4. The method according to claim 1, the adjusting further comprising:
   adjusting the AC line current of the AC line with the active line filter by generating a positive compensating current when the at least one of the AC line voltage of the AC line and the AC line current of the AC line is less than the shape of the sinusoid.

5. A resistance welding apparatus comprising:
   a welding transformer including a primary side;
   an inverter constructed from a plurality of power semiconductors and configured to supply a pulse-width-modulated AC current to the primary side of the welding transformer; and
   a power grid connection apparatus configured to connect to an AC line and including (i) an active line filter connected to phases of the AC line and configured to measure at least one of an AC line voltage of an AC line and a AC line current of the AC line and to adjust the AC line current of the AC line by generating a compensating current based on a difference between the at least one of the AC line voltage of the AC line and the AC line current of the AC line with a shape of a sinusoid, (ii) a rectifier unit configured to rectify the adjusted AC line current, and (iii) a DC voltage intermediate circuit configured to route the rectified AC line current to the inverter.

6. The resistance welding apparatus according to claim 5, wherein the active line filter includes a measuring apparatus configured to measure at the least one of the AC line voltage of the AC line and the AC line current of the AC line using at least two phases of the AC line.

7. The resistance welding apparatus according to claim 5, wherein the active line filter is configured to generate a negative compensating current when the at least one of the AC line voltage of the AC line and the AC line current of the AC line is greater than the shape of the sinusoid.

8. The resistance welding apparatus according to claim 5, wherein the active line filter is configured to generate a positive compensating current when the at least one of the AC line voltage of the AC line and the AC line current of the AC line is less than the shape of the sinusoid.

* * * * *